Aug. 4, 1925.
J. A. DANN
1,548,117
MARSH HORSESHOE
Filed July 6, 1923
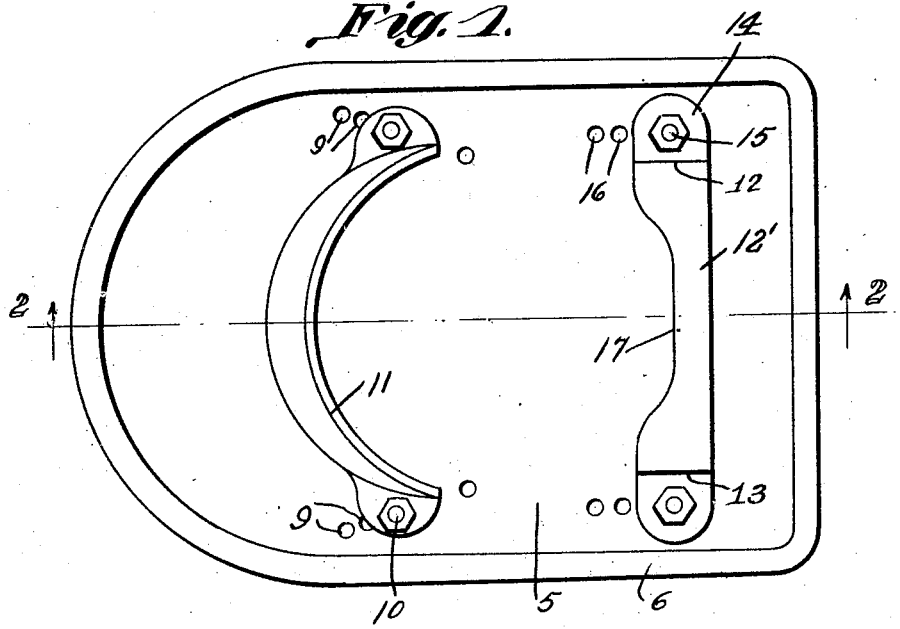
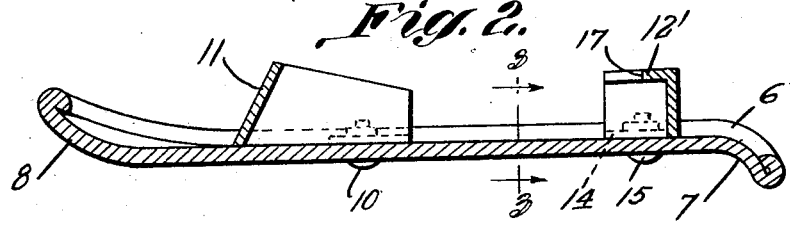
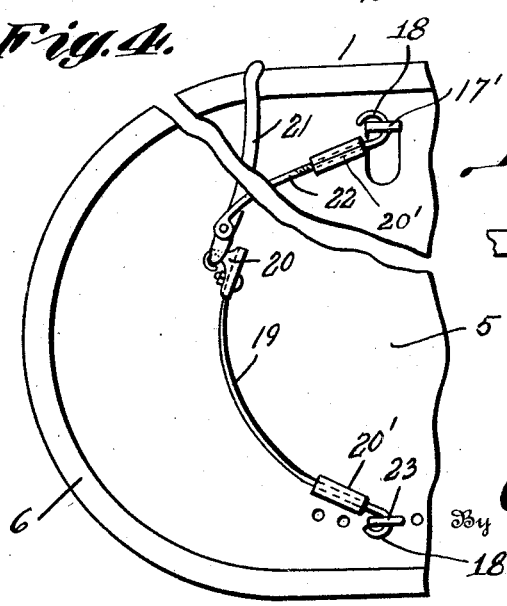
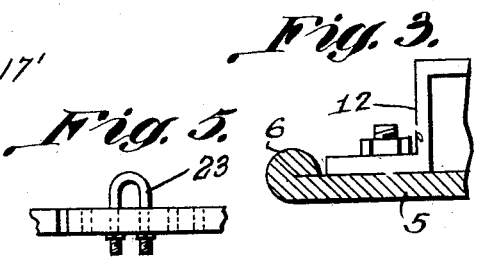
J. A. Dann,
Inventor
By C. A. Snow & Co.
Attorney Patented Aug. 4, 1925.

1,548,117

UNITED STATES PATENT OFFICE.

JOSEPH ARTHUR DANN, OF MIAMI FLORIDA.

MARSH HORSESHOE.

Application filed July 6, 1923. Serial No. 649,858.

*To all whom it may concern:*

Be it known that I, JOSEPH A. DANN, a citizen of the United States, residing at Miami, in the county of Dade and State of Florida, have invented a new and useful Marsh Horseshoe, of which the following is a specification.

This invention relates to shoes or the like designed for use with draft animals, so that the animal supplied with shoes of this character will be prevented from sinking into the ground surface when working in swampy or low lands.

The primary object of the invention is to provide a device of this character which will increase the ground-engaging surface of the hoof of the horse, and one which will prevent slipping of the horse.

A still further object of the invention is the provision of means at the forward end of the boot for eliminating any possibility of the forward portion of the boot catching in obstructions, to retard the progress of the animal.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 illustrates a plan view of a boot constructed in accordance with the present invention, Fig. 2 is a sectional view taken on line 2—2 of Fig. 1, Fig. 3 illustrates a sectional view taken on line 3—3 of Fig. 2, Fig. 4 illustrates a fragmental detail view of another form of securing means, and Fig. 5 is a detail view of a part of this form of securing means.

Referring to the drawing in detail, the reference character 5 designates the body portion of the shoe, which is formed preferably of sheet metal, the same being relatively wide so that portions thereof will extend beyond the side edges of an animal's hoof, to which the same is applied.

The body portion 5 is provided with a rolled edge as indicated at 6, which rolled edge is designed to reinforce the body portion 5 and eliminate any possibility of the same bending under the weight of the animal using the same, and in order that the shoe will not slide over the ground surface, the rear edge thereof is turned downwardly as at 7, the downturned edge providing a rib throughout the entire width of the shoe.

As shown, the forward portion of the shoe is rounded and extends upwardly as at 8 so that when the same is moved over the ground surface, the forward portion will have a tendency to cam the forward portion of the shoe upwardly, over any obstruction which might be in the path of travel of the animal using the boot, and at the same time eliminating any possibility of the boot catching under weeds, brush, or the like.

Formed in the upper surface of the body portion 5 and adjacent to opposite sides thereof, are the rows of openings 9, which rows of openings extend at angles with relation to the side edges of the body portion 5 and are provided to accommodate securing bolts 10, the bolts 10 being for the purpose of securing the hoof clamping member 11 to the body portion 5. From the foregoing it is obvious that the hoof clamping member 11 may be removed, and a hoof clamping member of greater width applied to the body portion, thereby adapting the shoe for use with animals having various sized hoofs.

This hoof clamping member 11 is formed of a relatively wide band which has its lower edge cut at an angle as at 11' so that the clamping member will be supported at an angle with relation to the body portion 5, or in a manner to closely embrace the forward portion of an animal's hoof.

The securing means employed for securing the rear portion of the hoof to the body portion 5 includes a plate 12' comprising right-angled ends 12 and 13 which have their extremities flattened as at 14 and apertured to accommodate the securing bolts 15, which pass through either of the openings 16 for securing the plate 12' to the body portion 5. As shown, this plate 12' has its forward edge cut away at 17 to provide a clearance to permit of free movement of that portion of an animal's hoof disposed above the plate 12'.

In the form of the invention as indicated by Fig. 4, a portion of the body portion 5 may be stamped therefrom and bent upwardly as at 17' to provide an ear, the same being apertured to receive one of the hooks 18. The band 19 which carries one of said hooks 18 is also provided with a hook member 20, which is engaged by one extremity of the lever 21 that is pivotally carried at one extremity of the band 22.

When this securing means is to be employed, the bands 19 and 22 are positioned over the forward portion of a hoof of an animal, and the lever 21 is operated to tighten the bands over the hoof.

It might be further stated that the hooks 18 are connected to the members 19 and 22 by means of the turnbuckles 20' whereby an adjustment of the members 18, 19 and 22, with respect to each other, may be had.

As shown by Fig. 5, U-bolts 23 are employed in place of the members 17', whereupon an exeptionally strong connection is provided between the body portion 5 and securing member.

In the use of the device as shown by the form of the invention, illustrated by Figs. 1 and 2 an animal's hoof is clamped under the member 11, the rear extensions of the shoe of the animal being clamped under the securing member 12', whereupon the animal's hoof is clamped to the body portion against displacement.

What is claimed as new is:—

In a device of the character described, a body portion, an ear stamped from the body portion at one side and extending upwardly therefrom, said body portion having a plurality of openings disposed in spaced relation with each other and arranged at the opposite side of the body portion, a U-bolt adapted for positioning in the openings, a hook adapted for securing to the U-bolt, a hook member adapted to extend through the ear, bands associated with the hooks, turnbuckles for adjustably connecting the bands and hooks, and a pivoted lever for connecting the opposite ends of the bands to cause the bands to move into engagement with an animal's hoof.

In testimony that I claim the foregoing as my own, I have hereto affixed my signature in the presence of two witnesses.

JOSEPH ARTHUR DANN.

Witnesses:
 BEN SHEPARD,
 H. H. MCNEIL.